(12) United States Patent
Horng et al.

(10) Patent No.: US 8,123,392 B2
(45) Date of Patent: Feb. 28, 2012

(54) LINEAR LIGHT GUIDING MODULE

(75) Inventors: Alex Horng, Kaohsiung (TW);
Masaharu Miyahara, Kaohsiung (TW);
Ssu-Hao Lai, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 36 days.

(21) Appl. No.: 12/554,482

(22) Filed: Sep. 4, 2009

(65) Prior Publication Data

US 2011/0013419 A1 Jan. 20, 2011

(30) Foreign Application Priority Data

Jul. 15, 2009 (TW) .............................. 98123948 A

(51) Int. Cl.
*F21V 7/04* (2006.01)
(52) U.S. Cl. ......... 362/612; 362/613; 362/615; 362/616
(58) Field of Classification Search .................. 362/612, 362/613, 610, 616, 615, 608
See application file for complete search history.

(56) References Cited

U.S. PATENT DOCUMENTS

| | | | |
|---|---|---|---|
| 7,651,249 B2* | 1/2010 | Ohashi et al. ................. | 362/373 |
| 2006/0072344 A1* | 4/2006 | Kim et al. ...................... | 362/632 |
| 2007/0076431 A1* | 4/2007 | Atarashi et al. ............... | 362/613 |
| 2008/0232134 A1* | 9/2008 | Weng et al. .................... | 362/612 |
| 2009/0175035 A1* | 7/2009 | Jiang ............................. | 362/234 |

* cited by examiner

*Primary Examiner* — Evan Dzierzynski
(74) *Attorney, Agent, or Firm* — WPAT, P.C.; Anthony King

(57) ABSTRACT

A linear light guiding module is provided, which includes a linear light guiding body, a plurality of light emitting bodies, a plurality of heat sinks, and a plurality of fans. With the linear light guiding body, the light emitting bodies, and the heat sinks linearly arranged, or with the fans further integrated, the linear light guiding module of the present invention has a small size and an effective heat-dissipation effect. Since only one linear light guiding module needs to be disposed on one side of a light guide plate, the linear light guiding module can be used in large-sized liquid crystal display panels. Moreover, the number of the linear light guiding modules used is decreased while the requirements for high brightness and brightness uniformity can still be met, so the cost can be reduced.

21 Claims, 5 Drawing Sheets

LINEAR LIGHT GUIDING MODULE

BACKGROUND OF THE INVENTION

1. Field of the Invention

The present invention relates to a light guiding module, in particular, to a linear light guiding module.

2. Description of the Related Art

In recent years, liquid crystal displays (LCDs) have become indispensable in daily life. For example, LCD television is now an essential household appliance. A light guide plate (LGP) module is an important component in an LCD backlight system of an LCD, and can guide light rays emitted by a point light source such as a light emitting diode (LED) or a linear light source such as a cold-cathode tube, so that the light rays are scattered and emitted over a plane, thus improving the uniformity in gray scale and brightness of the light emitted by the LCD panel. A linear light guiding module can better meet the demand for increasingly thinner LCDs.

FIG. 1 is a schematic view of a configuration of conventional linear light guiding modules, an LCD panel, and an LGP. The LCD panel 11 is disposed in parallel with the LGP 12, and a plurality of conventional linear light guiding modules 13 is disposed on one side at the bottom of the LGP 12. Each conventional linear light guiding module 13 includes a linear light guiding body 131 and a plurality of light emitting diodes 132. The light emitting bodies 132 are disposed at two opposite ends of the linear light guiding body 131, so that light rays generated by the light emitting bodies 132 are guided into the linear light guiding body 131.

As a great deal of heat is generated when the light emitting bodies 132 generates a light source, the conventional linear light guiding module 13 cannot be used in high-power LEDs. Meanwhile, the length of the conventional linear light guiding module 13 is also limited. Therefore, a plurality of conventional linear light guiding modules 13 must be disposed on one side of the LGP 12 at the same time, so as to meet the requirements for high brightness and brightness uniformity as well as effective heat dissipation. However, when a large number of linear light guiding modules are disposed in one unit, the production cost is greatly increased, and the overall heat-dissipation effect is not satisfactory.

Therefore, it is necessary to provide a linear light guiding module to solve the above problems.

SUMMARY OF THE INVENTION

The present invention provides a linear light guiding module, which includes a linear light guiding body, a plurality of light emitting bodies, and a plurality of heat sinks. The light emitting bodies are disposed at two opposite ends of the linear light guiding body, so that light rays generated by the light emitting bodies are guided into the linear light guiding body. A side surface of each heat sink is connected to one of the light emitting bodies.

The present invention further provides a linear light guiding module, which includes a linear light guiding body, a plurality of light emitting bodies, a plurality of heat sinks, and a plurality of fans. The light emitting bodies are disposed at two opposite ends of the linear light guiding body, so that light rays generated by the light emitting bodies are guided into the linear light guiding body. A side surface of each heat sink is connected to one of the light emitting bodies. Each fan is connected to at least one of the other side surfaces of a heat sink.

With the linear light guiding body, the light emitting bodies, and the heat sinks assembled, or with the fans further integrated, the linear light guiding module of the present invention has a small size, and can effectively remove the heat generated by the light emitting bodies, and can thus solve the problem of heat dissipation in high-power light emitting bodies. Besides, the linear light guiding module of the present invention can be flexibly disposed on at least one side of an LGP to meet different requirements for brightness and brightness uniformity. Moreover, since the heat generated by the light emitting bodies is effectively removed, and since the linear light guiding module of the present invention has a great length, the linear light guiding module of the present invention can be used in large-sized LCD panels, and the number of the linear light guiding modules used can be decreased, thus reducing the cost.

DETAILED DESCRIPTION OF THE INVENTION

Figure 1:
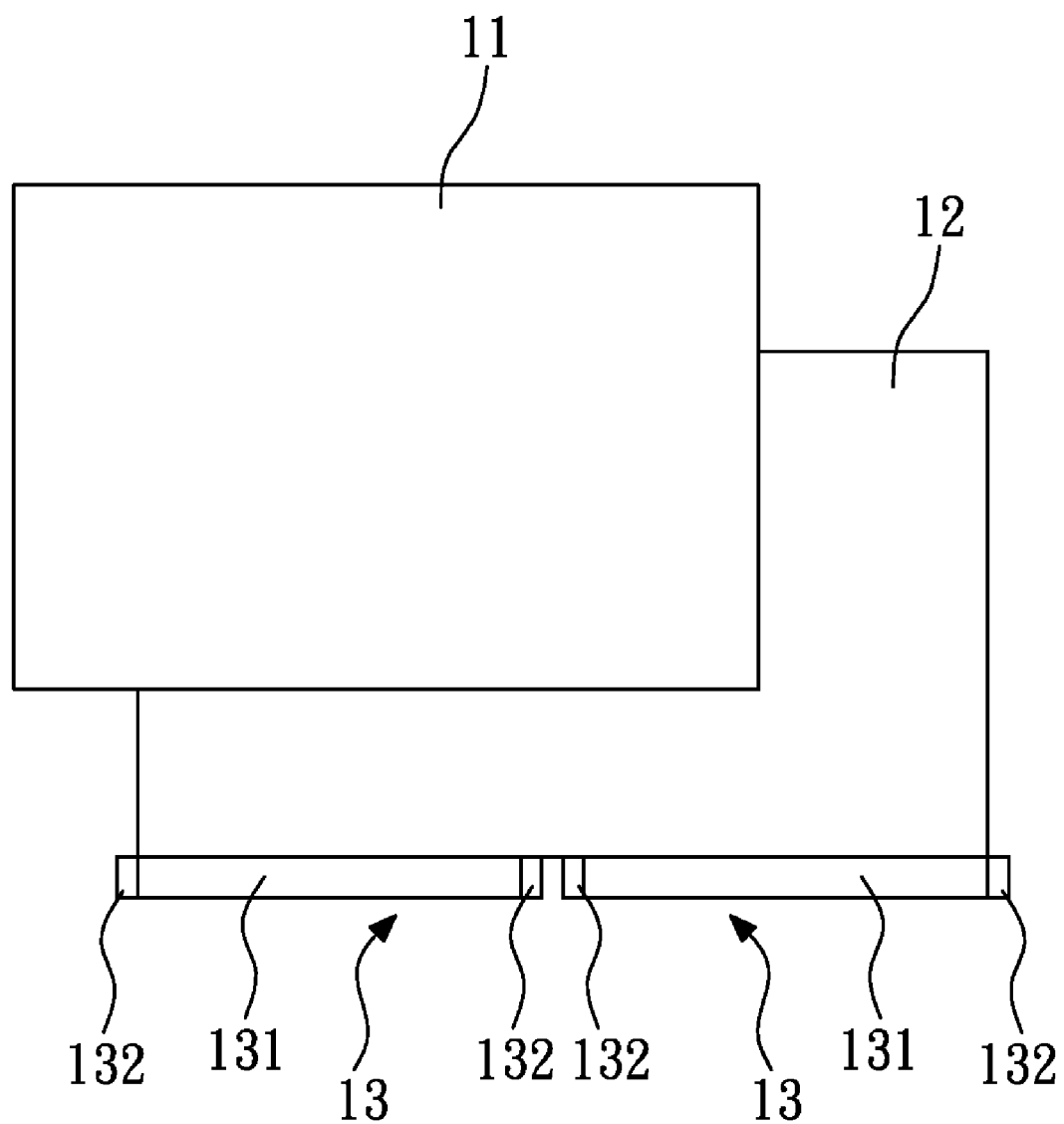
FIG. 1 is a schematic view of a configuration of conventional linear light guiding modules, an LCD panel, and an LGP.
Figure 2:
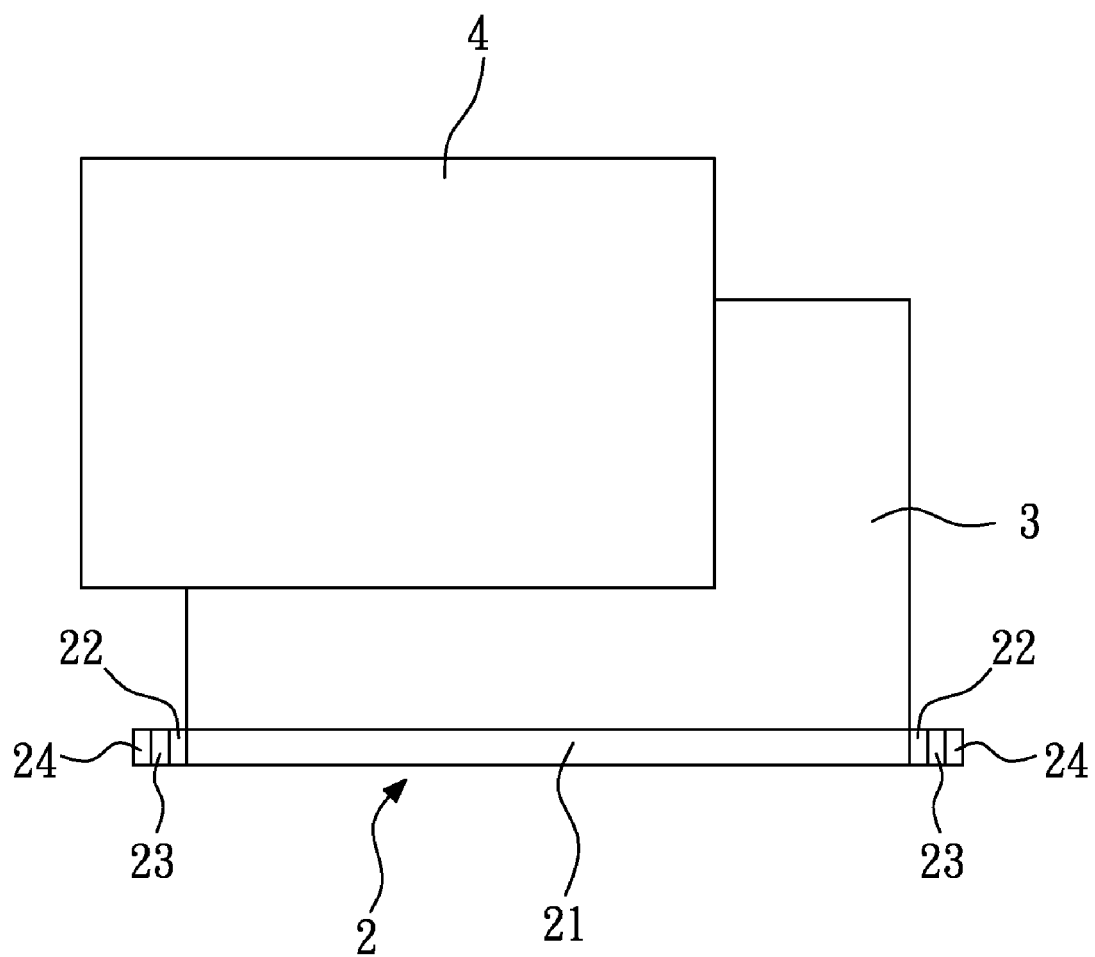
FIG. 2 is a schematic view of a configuration of a linear light guiding module of the present invention, an LCD panel, and an LGP.
Figure 3:
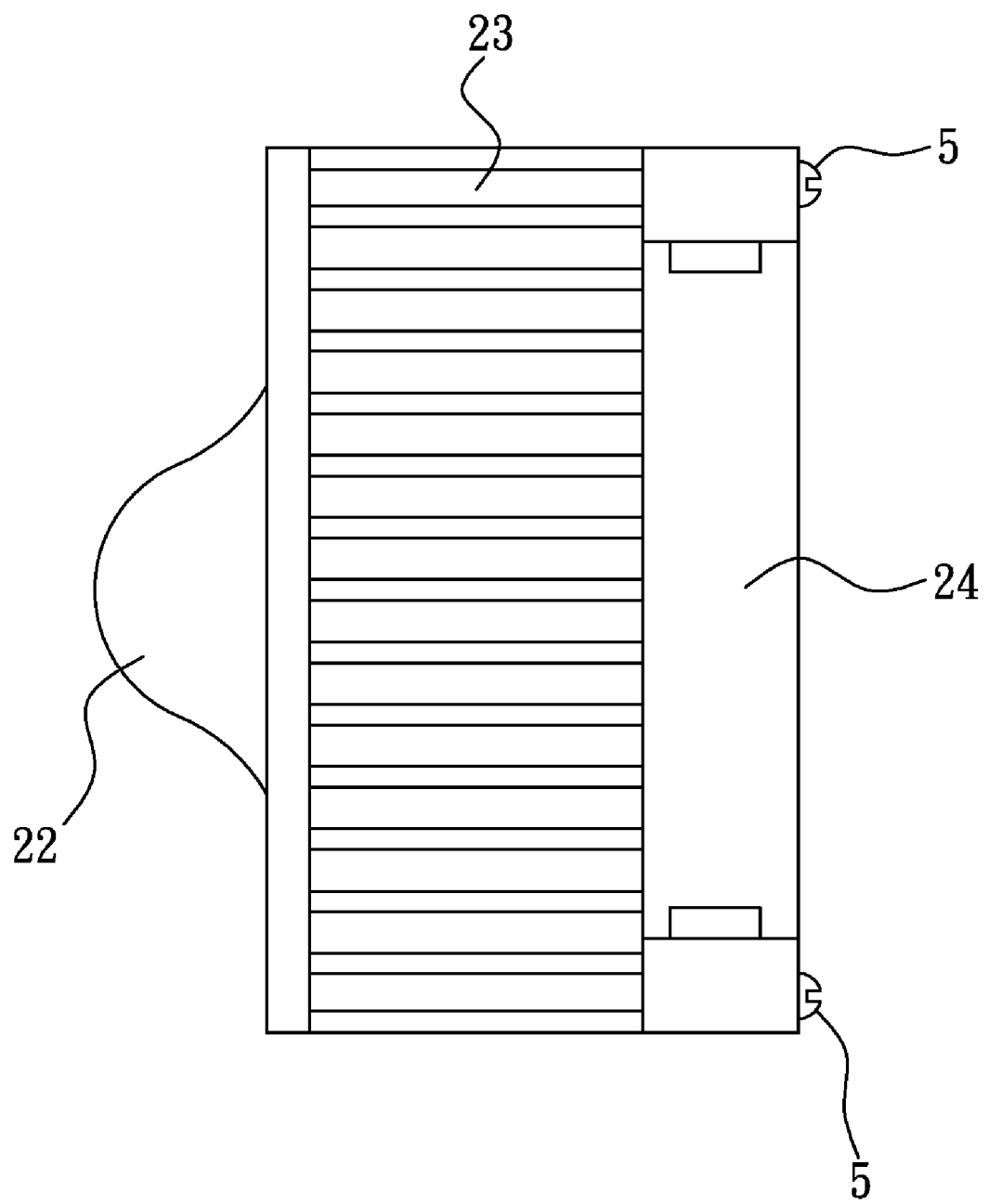
FIG. 3 is an assembled view of light emitting bodies, heat sinks, and fans of a linear light guiding module of the present invention.

FIG. 2 is a schematic view of a configuration of a linear light guiding module of the present invention, an LCD panel, and an LGP; FIG. 3 is an assembled view of light emitting bodies, heat sinks, and fans of a linear light guiding module of the present invention; and FIG. 4 is an exploded view of light emitting bodies, heat sinks, and fans of a linear light guiding module of the present invention.

Figure 4:
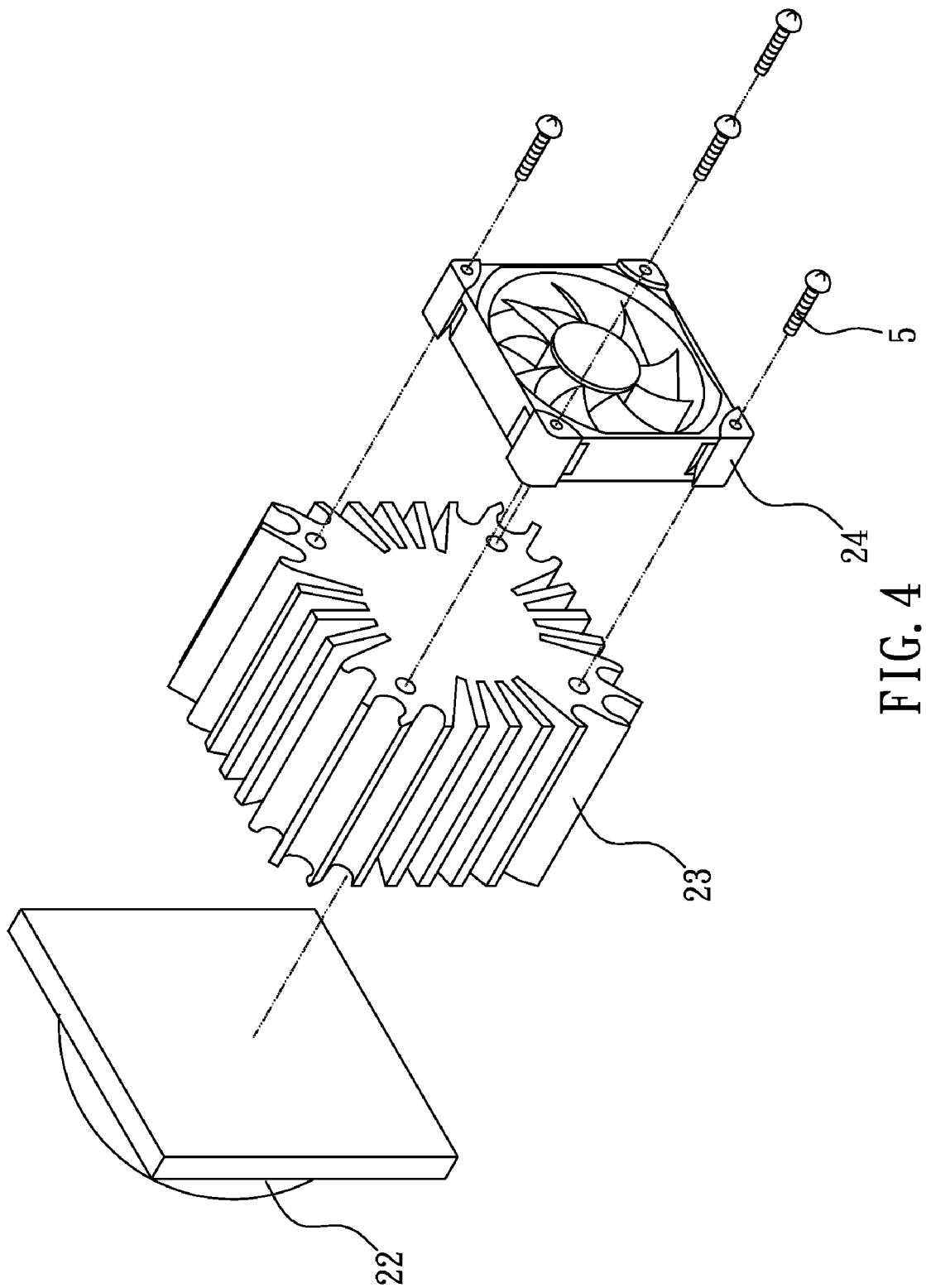
FIG. 4 is an exploded view of light emitting bodies, heat sinks, and fans of a linear light guiding module of the present invention.

As shown in FIGS. 2 to 4, the linear light guiding module 2 of the present invention may be disposed on at least one side of the LGP 3. In this embodiment, the linear light guiding module 2 is disposed on one side at the bottom of the LGP 3, and an LCD panel 4 is disposed substantially in parallel with the LGP 3; in other words, the linear light guiding module 2 is disposed on one side at the bottom of the LCD panel 4 and the LGP 3. It should be understood that the linear light guiding module 2 may also be disposed on any side at the top or bottom or at the left or right of the LGP 3.

In this embodiment, the linear light guiding module 2 includes a linear light guiding body 21, a plurality of light emitting bodies 22, a plurality of heat sinks 23, and a plurality of fans 24. The light emitting bodies 22 are disposed at two opposite ends of the linear light guiding body 21, so that light rays generated by the light emitting bodies 22 are guided into the linear light guiding body 21 and then uniformly enter the LGP 3. According to requirements of different applications, the light emitting bodies 22 may be point light sources such as LEDs and bulbs, or linear light sources such as cold-cathode tubes.

In this embodiment, a side surface of each heat sink 23 is connected to and directly in contact with a light emitting body 22, so as to remove the heat generated by the light emitting bodies 22. In other applications, a heat dissipation medium (for example, a heat sink paste or a thermal pad, not shown) may be further disposed between each light emitting body 22 and a corresponding heat sink 23, so as to improve the thermal conduction effect between the light emitting bodies 22 and the heat sinks 23. The heat sinks 23 may be made of copper or a copper alloy, or aluminum or an aluminum alloy.

Each fan 24 is connected to at least one of the other side surfaces of a heat sink 23. In this embodiment, the fans 24 are disposed on two side surfaces of the heat sinks 23 at the left and right of FIG. 2, so that the linear light guiding body 21, the light emitting bodies 22, the heat sinks 23, and the fans 24 are linearly arranged. However, in other applications, the fans 24 may also be disposed on at least one of an upper side surface, a lower side surface, a left side surface, and a right side surface of the heat sink 23 as shown in FIG. 4. The heat generated by the light emitting bodies 22 is absorbed by the heat sinks 23, and then rapidly dissipated to the outside by the fans 24.

According to different applications, the light emitting bodies 22 may be fixed to a side surface of the heat sinks 23 by, for example but not limited to, adhesion, and the fans 24 may be coupled to another side surface of the heat sinks 23 by fixing elements 5 such as screws or pins (as shown in FIGS. 3 and 4).

The sizes of the heat sinks 23 and the fans 24 are set according to the power of the light emitting bodies 22. For example, in this embodiment, the thickness of the heat sinks 23 is less than 20 mm, and the thickness of the fans 24 is less than 15 mm. On the whole, the heat sinks 23 and the fans 24 used in the present invention are extremely thin, so that the size of the linear light guiding module 2 of the present invention is not greatly increased, but the heat generated by the light emitting bodies 22 can be removed more effectively.

The linear light guiding module 2 is selectively disposed on at least one side of the LGP 3, and only one linear light guiding module 2 needs to be disposed on any side of the LGP 3. In this embodiment, only one linear light guiding module 2 is disposed on a long side at the bottom of the LGP 3.

Figure 5:
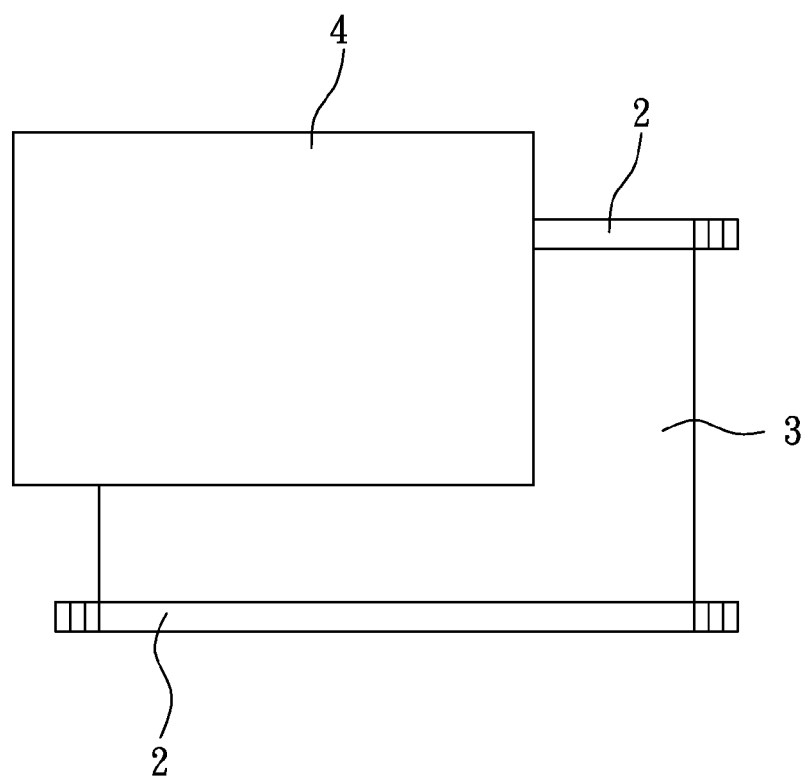
FIG. 5 is a schematic view of linear light guiding modules of the present invention disposed on two opposite long sides at the top and bottom of an LGP.
Figure 6:
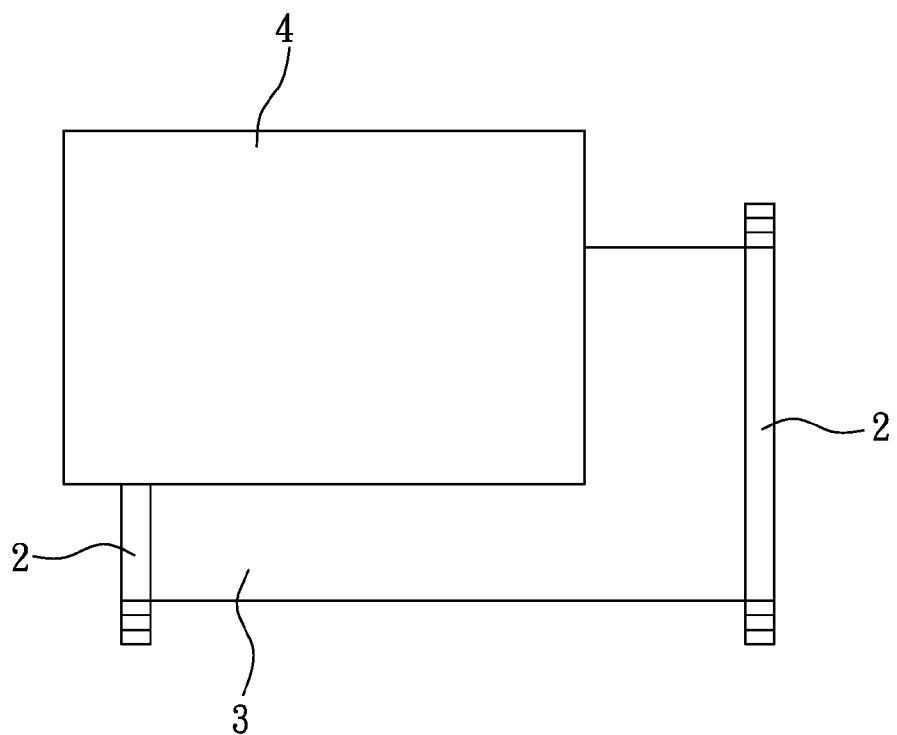
FIG. 6 is a schematic view of linear light guiding modules of the present invention disposed on two opposite short sides at the left and right of an LGP.

It should be noted that, according to different requirements for brightness and brightness uniformity, in other applications, at least one linear light guiding module 2 may be disposed on a long side of the LGP 3 or a short side of the LGP 3. For example, the linear light guiding module 2 of the present invention may be disposed as shown in FIGS. 5 and 6. FIG. 5 is a schematic view of linear light guiding modules 2 of the present invention disposed on two opposite long sides at the top and bottom of the LGP 3; and FIG. 6 is a schematic view of linear light guiding modules 2 of the present invention disposed on two opposite short sides at the left and right of the LGP 3.

In other applications, when the disposed heat sinks 23 are sufficient for removing the heat generated by the light emitting bodies 22, the linear light guiding module 2 of the present invention may only include the linear light guiding body 21, the light emitting bodies 22, and the heat sinks 23, and the fans 24 may be omitted.

With the linear light guiding body 21, the light emitting bodies 22, and the heat sinks 23 assembled, or with the fans 24 further integrated, the linear light guiding module 2 of the present invention has a small size, and can effectively remove the heat generated by the light emitting bodies 22, and can thus solve the problem of heat dissipation in high-power light emitting bodies without using any heat pipe. Besides, the linear light guiding module 2 of the present invention can be flexibly disposed on at least one side of the LGP 3 to meet different requirements for brightness and brightness uniformity. Moreover, since the heat generated by the light emitting bodies 22 is effectively removed, and since the linear light guiding module 2 of the present invention has a great length, the linear light guiding module 2 of the present invention is applicable in large-sized LCD panels, and the number of the linear light guiding modules 2 used can be decreased, thus reducing the cost.

While the embodiments of the present invention have been illustrated and described, various modifications and improvements can be made by those skilled in the art. The embodiments of the present invention are therefore described in an illustrative but not restrictive sense. It is intended that the present invention is not limited to the particular forms as illustrated, and that all modifications that maintain the spirit and scope of the present invention are within the scope defined in the appended claims.

What is claimed is:

1. A linear light guiding module, comprising:
a linear light guiding body;
a LCD panel, wherein the LCD panel having four sides;
a plurality of light emitting bodies, disposed at two opposite ends of the linear light guiding body, so that light rays generated by the light emitting bodies are guided into the linear light guiding body, the linear light guiding module is disposed on one of the fours sides of the LCD panel and a light guide plate (LGP); and
a plurality of heat sinks, wherein a side surface of each heat sink is connected to one of the light emitting bodies,
wherein the plurality of light emitting bodies are not disposed along an entire length of any of the four sides the LCD.

2. The linear light guiding module according to claim 1, wherein the light emitting bodies are light emitting diodes (LEDs) or cold-cathode tubes.

3. The linear light guiding module according to claim 1, wherein the linear light guiding module is disposed on at least one side of a light guide plate (LGP).

4. The linear light guiding module according to claim 1, wherein the heat sinks are made of copper or a copper alloy.

5. The linear light guiding module according to claim 1, wherein the heat sinks are made of aluminum or an aluminum alloy.

6. The linear light guiding module according to claim 1, wherein the sizes of the heat sinks are set according to power of the light emitting bodies.

7. The linear light guiding module according to claim 1, further comprising: a heat dissipation medium, disposed between each light emitting body and a corresponding heat sink.

8. The linear light guiding module according to claim 7, wherein the heat dissipation medium is a heat sink paste.

9. The linear light guiding module according to claim 7, wherein the heat dissipation medium is a thermal pad.

10. A linear light guiding module, comprising:
a linear light guiding body;
a LCD panel, wherein the LCD panel having four sides;
a plurality of light emitting bodies, disposed at two opposite ends of the linear light guiding body, so that light rays generated by the light emitting bodies are guided into the linear light guiding body, the linear light guiding module is disposed on one of the fours sides of the LCD panel and a light guide plate (LGP);
a plurality of heat sinks, wherein a side surface of each heat sink is connected to one of the light emitting bodies; and a plurality of fans, each connected to at least one of the other side surfaces of a heat sink, wherein the plurality of light emitting bodies are not disposed along an entire length of any of the four sides the LCD.

11. The linear light guiding module according to claim 10, wherein the light emitting bodies are light emitting diodes or cold-cathode tubes.

12. The linear light guiding module according to claim 10, wherein the linear light guiding module is disposed on at least one side of a light guide plate.

13. The linear light guiding module according to claim 10, wherein the heat sinks are made of copper or a copper alloy.

14. The linear light guiding module according to claim 10, wherein the heat sinks are made of aluminum or an aluminum alloy.

15. The linear light guiding module according to claim 10, wherein the fans are coupled to the heat sinks by screws.

16. The linear light guiding module according to claim 10, wherein the fans are coupled to the heat sinks by pins.

17. The linear light guiding module according to claim 10, wherein the sizes of the heat sinks and the fans are set according to power of the light emitting bodies.

18. The linear light guiding module according to claim 17, wherein the thickness of the heat sinks is less than 20 mm, and the thickness of the fans is less than 15 mm.

19. The linear light guiding module according to claim 10, further comprising: a heat dissipation medium, disposed between each light emitting body and a corresponding heat sink.

20. The linear light guiding module according to claim 19, wherein the heat dissipation medium is a heat sink paste.

21. The linear light guiding module according to claim 19, wherein the heat dissipation medium is a thermal pad.

\* \* \* \* \*